US006845401B1

(12) United States Patent
Papadopoulos et al.

(10) Patent No.: US 6,845,401 B1
(45) Date of Patent: Jan. 18, 2005

(54) EMBEDDED FILE SYSTEM FOR A PROGRAMMABLE LOGIC CONTROLLER

(75) Inventors: A. Dean Papadopoulos, Groton, MA (US); Allan Tanzman, Newton, MA (US); Rodolfo G. Belliardi, Nalden, MA (US); Richard A. Baker, Newbury, MA (US); Alain Lafuite, Falicon (FR)

(73) Assignee: Schneider Automation Inc., North Andover, MA (US)

( * ) Notice: Subject to any disclaimer, the term of this patent is extended or adjusted under 35 U.S.C. 154(b) by 0 days.

(21) Appl. No.: 09/223,402

(22) Filed: Dec. 30, 1998

(51) Int. Cl.[7] .............................................. G06F 13/00
(52) U.S. Cl. ...................... 709/250; 709/203; 709/218
(58) Field of Search ............................... 709/203, 250, 709/218

(56) References Cited

U.S. PATENT DOCUMENTS

| | | | |
|---|---|---|---|
| 3,971,000 A | 7/1976 | Cromwell | 700/84 |
| 4,319,338 A | 3/1982 | Grudowski et al. | 710/109 |
| 4,688,167 A | 8/1987 | Agarwal | 345/803 |
| 4,845,644 A | 7/1989 | Anthias et al. | 345/803 |
| 4,858,152 A | 8/1989 | Estes | 702/186 |
| 4,897,777 A | 1/1990 | Janke et al. | 700/5 |
| 4,912,623 A | 3/1990 | Rantala et al. | 700/7 |
| 4,937,777 A | 6/1990 | Flood et al. | 710/107 |
| 4,949,274 A | 8/1990 | Hollander et al. | 324/142 |
| 4,953,074 A | 8/1990 | Kametani et al. | 700/3 |
| 4,992,926 A | 2/1991 | Janke et al. | 709/225 |
| 5,012,402 A | 4/1991 | Akiyama | 700/87 |
| 5,023,770 A | 6/1991 | Siverling | 700/11 |
| 5,047,959 A | 9/1991 | Phillips et al. | 345/853 |
| 5,072,356 A | 12/1991 | Watt et al. | 700/23 |
| 5,072,412 A | 12/1991 | Henderson, Jr. et al. | 345/804 |
| 5,109,487 A | 4/1992 | Ohgomori et al. | 709/237 |
| 5,122,948 A | 6/1992 | Zapolin | 340/3.53 |
| 5,131,092 A | 7/1992 | Sackmann et al. | 709/207 |
| 5,134,574 A | 7/1992 | Beaverstock et al. | 702/84 |
| 5,151,896 A | 9/1992 | Bowman | 370/401 |
| 5,151,978 A | 9/1992 | Bronikowski | 709/216 |
| 5,157,595 A | 10/1992 | Lovrenich | 700/7 |
| 5,159,673 A | 10/1992 | Sackmann et al. | 709/216 |
| 5,161,211 A | 11/1992 | Taguchi et al. | 706/62 |
| 5,165,030 A | 11/1992 | Barker | 703/20 |

(List continued on next page.)

FOREIGN PATENT DOCUMENTS

| | | |
|---|---|---|
| DE | 296 00 609 U1 | 3/1997 |
| DE | 441 0 171 C1 | 4/1997 |
| DE | 196 15 093 A1 | 10/1997 |
| EP | 0 542 657 A1 | 5/1993 |
| EP | 0 814 393 A1 | 12/1997 |
| WO | WO 97/18636 | 5/1997 |
| WO | WO 98/53581 | 11/1998 |

OTHER PUBLICATIONS

Abstract of "Implementing distributed controls for FMC's using Internet utilities," S. S. Jagdale and N. Merchant; Computers of Industrial Engineering, vol.. 31 No. 1–2, p. 87–90; Oct., 1996 (UK).

(List continued on next page.)

*Primary Examiner*—Kenneth R. Coulter

(57) ABSTRACT

An apparatus is provided for storage of applications symbols, graphics, web pages, and other data within a server coupled to a programable logic controller. The server is operably connected to a network and the programable logic controller and includes a memory, an FTP server, and a HTTP server. The FTP server is operably connected to the memory and the network for transferring files into the memory. The HTTP is operably connected to the memory and the network for transferring web pages onto the network. Also, the programable logic controller is provided access to the memory within the server for downloading files into the memory of the controller.

11 Claims, 1 Drawing Sheet

U.S. PATENT DOCUMENTS

| | | | |
|---|---|---|---|
| 5,179,700 A | 1/1993 | Aihara et al. | 345/866 |
| 5,225,974 A | 7/1993 | Mathews et al. | 700/11 |
| 5,245,704 A | 9/1993 | Weber et al. | 709/215 |
| 5,251,302 A | 10/1993 | Weigl et al. | 710/263 |
| 5,283,861 A | 2/1994 | Dangler et al. | 345/740 |
| 5,297,257 A | 3/1994 | Struger et al. | 700/83 |
| 5,307,463 A | 4/1994 | Hyatt et al. | 710/1 |
| 5,321,829 A | 6/1994 | Zifferer | 714/46 |
| 5,349,675 A | 9/1994 | Fitzgerald et al. | 379/102.01 |
| 5,398,336 A | 3/1995 | Tantry et al. | 707/103 R |
| 5,406,473 A | 4/1995 | Yoshikura et al. | 700/20 |
| 5,420,977 A | 5/1995 | Sztipanovits et al. | 345/853 |
| 5,440,699 A | 8/1995 | Farrand et al. | 345/740 |
| 5,446,868 A | 8/1995 | Gardea et al. | 703/27 |
| 5,528,503 A | 6/1996 | Moore et al. | 700/95 |
| 5,598,536 A | 1/1997 | Slaughter, III et al. | 709/219 |
| 5,613,115 A | 3/1997 | Gihl et al. | 717/123 |
| 5,623,652 A | 4/1997 | Vora et al. | 707/10 |
| 5,625,781 A | 4/1997 | Cline et al. | 345/854 |
| 5,699,350 A | 12/1997 | Kraslavsky | 370/254 |
| 5,734,831 A | 3/1998 | Sanders | 709/223 |
| 5,805,442 A | 9/1998 | Crater et al. | 700/9 |
| 5,862,391 A | 1/1999 | Salas et al. | 713/300 |
| 5,950,006 A | 9/1999 | Crater et al. | 717/140 |
| 5,975,737 A | 11/1999 | Crater et al. | 700/9 |
| 5,982,362 A | 11/1999 | Crater et al. | 345/719 |
| 5,990,884 A * | 11/1999 | Douma et al. | 345/716 |
| 5,997,167 A | 12/1999 | Crater et al. | 700/79 |
| 6,134,552 A * | 10/2000 | Fritz et al. | 707/10 |
| 6,151,625 A * | 11/2000 | Swales et al. | 709/218 |
| 6,282,454 B1 * | 8/2001 | Papadopoulos et al. | 700/83 |
| 6,311,101 B1 * | 10/2001 | Kastner | 700/197 |
| 6,321,272 B1 * | 11/2001 | Swales | 709/250 |
| 6,370,550 B1 * | 4/2002 | Douma et al. | 715/500.1 |
| 6,370,569 B1 * | 4/2002 | Austin | 709/217 |
| 6,453,210 B1 * | 9/2002 | Belotserkovskiy et al. | 700/96 |
| 6,567,863 B1 | 5/2003 | Lafuite | 710/8 |

OTHER PUBLICATIONS

Abstract of "Process Control takes to the Net," Greg Paula, Mechanical Engineering vol. 118 No. 12 Dec. 1996, p. 55.

Abstract of "Remote interrogation and control of sensors via the internet," Peter L. Furh and Euan F. Mowat; Sensors, vol. 12 No. 12, 6 pp; Dec. 1995.

Abstract of "Process control takes to the Net," G. Paula; Mechanical Engineering, vol. 118, No. 12, p. 55, Dec. 1996..

Abstract of Implementation of CAN/CAN bridges in distributed environments and performance analysis of bridged CAN systems using SAE benchmark, H. Ekiz, A. Kutlu and E. T. Powner; Conference Paper, IEEE Southeastern '97, Engineering the new energy, IEEE, p. 185–7, 1996.

Abstract of "Managing interdisciplinary project teams through the Web," R. E. Goodman and P. Chinowsky; Conference Paper, WebbNet 96—World Conference of the Web Society, pp. 180–185, 1996.

Abstract of "Learning environment for a process automation system using computer networks," J. Lindfors, L. Yliniemi and K. Leivska; Conference Paper, Step '96—Genes, Nets and Symbols, pp. 137–143, 1996 (Finland).

Abstract of "Distributed agent systems for intelligent manufacturing,"D. H. Norrie and B. R. Gaines; Canadian Artificial Intelligence, No. 40, p. 31–3, Autumn 1996 (Canada).

Abstract of Proceedings of AUTOFACT 1995 Conference, "Today's Automated, Integrated Factory," Soc. Manuf., Eng., Dearborn, MI; 1995.

Abstract of "The ECOSSE Control HyperCourse," C. M. Merrick and J. W. Ponton; Computers & Chemical Engineering, vol. 20, Part B, p. S 1353–8, 1996 (UK).

Abstract of "Chemical–better batch controls," T. Crowl; Contorl & Instrumentation, vol. 28, No. 5, p. 53–4, May 1996 (UK).

Abstract of "Industrial software does 32–bit Windows, prepares for the net," W. Labs; I 8CS, vol. 69, No. 3, p. 23–6, 31–4, Mar. 1996, USA.

Abstract of "A case study for international remote machining;" G. C. I. Lin and Kao Yung–Chou; Conference Paper, Proc. SPIE–Int. Soc. Opt. Eng., vol. 2620, p 553–60, 1995.

Abstract of "Standardization of long–distance protocols," R. Dinges; Journal Paper, Generation Changes in Network Conductor Systems, ITG—Fachberichte, vol. 134, p. 97–113, 1995 (West Germany).

Abstract of "Proceedings of AUTOFACT Conference," Soc. Manuf. Eng., , 684 pp., Dearborn, MI; 1993.

Abstract of "Control system design V. Communications orchestrate process control,"F. Glow; In Tech, vol. 36, No. 9, p. 68–74, Sep. 1989.

Abstract of "Functions and characteristics of local networks adapted to industrial applications," J. Morlais; Electronique Industrielle, No. 97, p. 56–63, Nov. 15, 1985; France.

Abstract of "Intelligent supervisory control of submerged–arc furnaces," Markus A. Reuter, Carla Pretorius, Chloe West, Peter Dixon and Morne Oosthuizen, JOM vol. 48, No. 12, Dec. 1996, p. 49–51.

Abstract of "Simulation on the integration of process control systems of rolling mill plants through standard networks," Choo Young Yeol, Hwang Hwa Won and Kim Cheeha, Proceedings of the Industrial Computing Conference, Instrument Society of America, Research Triangle Park, NC, USA. P 1–14; vol. 6, No. 1, 1996.

Abstract of "Environmental waste control digest," Clayton H. Billings; Public Works vol. 127 No. 7, 6 pp, Jun., 1996.

Abstract of "Experiments in tele–handling and tele–machining at the macro and micro scales, using the Internet for operational environment transmission," Mamoru Mitsuishi, Toshio Hori, Tomoharu Hikita, Masao Teratani, Takuro Watanabe, Hirofumi Nakanishi and Bruce Kramer; IEEE International Conference on Intelligent Robots and Systems vol. 2, 1995.

Abstract of "A phototyping and reverse engineering system for mechanical parts–on–demand on the national network," Fred Hansen, Elias Pavlakos, Eric Hoffman, Takeo Kanade, Raj Reddy, Paul Wright; Journal of Manufacturing Systems, vol. 12 No. 4, p. 269–281; 1993.

Abstract of "Mathematical model and optimization of furfural treating process," Tao Peng, Jinshou Yu and Huihe Shao; Huadong Huagong Xueyuan Xuebao/Journal of East China Institute of Chemical Technology vol. 17 No. 1, p. 99–104; Feb. 1991.

Abstract of User's Aspect of Telecommunication and Information Processing in Plant Factory; Hashimoto Yasushi (1); Journal of the Institute of Electronics, Information and Communication Engineers, vol. 78, NO. 5, p. 475–81, Fig. 3, Ref. 7, 1995. (Japan).

Abstract of "High–efficient application technology of DCS from the viewpoint of users," Oka Norihito (1); Narita Tsutomu (1); (1) Yamatake–Honeywell Co., Ltd.; Otomeshon, vol. 40, No. 2, p. 24–28, Fig. 5, Part 2, 1995. (Japan).

Abstract of Users' experience with software tools for process intergration. General results; Stougie, L.; Roeterink, H.J.H.; Van Wijk, A.; Stikkelman, R.M.; Nov. 1996.

Abstract of "Integrated design and process technology. vol. 1;" Cooke, D.; Kraemer, B.J.; Sheu, P.C.Y.; Tsai, J.P.; Mittermeir, R.; Society for Design and Process Science, p. 51–57; 1996. (USA).

Abstract of "Integrated design and process technology. vol. 2;" Tanik, M.M.; Bastani, F.B.; Gibson, D.; Fielding, P.J.; Society for Design and Process Science, p. 423–430, 1996. (USA).

Abstract of "Integrated design and process technology. vol. 2" Tanik, M.M. Bastani, F.B.; Gibson, D.; Fielding, P.J.; Society for Design and Process Science, p. 306–312, 1996.

Abstract of "Need low–cost networking consider DeviceNet," W. H. Moss; InTech vol. 43:11; p. 30–31, Nov. 1996.

"Plastic Car Bodies Pass the Crash Test," mechanical engineering; vol. 118, No. 12; Dec. 1996.

"Remote Interrogation and Control of Sensors via the Internet," Sensors and Systems; Peter L. Fuhr and Euan F. Mowat; University of Vermont; pp. 25–30; Dec., 1999.

*LabVIEW Graphical Programming for Instrumentation, Networking Reference Manual,* © Copyright 1993, 1994 National Instruments Corporation, Part No. 320587B–01, Sep. 1994.

*LabVIEW Graphical Programming for Instrumentation, Tutorial for Windows,* © Copyright 1993, 1994 National Instruments Corporation, Part No. 320593B–01, Sep. 1994.

*Lab VIEW Graphical Programming for Instrumentation, Data Acquisition VI Reference Manual for Windows,* © Copyright 1992, 1994 National Instruments Corporation, Part No. 320536B–01, Sep. 1994.

"Ethernet Base Gateway Product," AEG–Modicon, published 1991.

"Modicon Modbus Plus Network BM85 Bridge Multiplexer User's Guide," Groupe Schneider, Aug. 1995.

"Modicon Modbus Plus Network Planning and Installation Guide," AEG Schneider Automation, Apr. 1996.

"Open Modbus/TCP Specification," A. Swales, Sep. 3, 1997.

"MEB Installation and Programming Manual," Niobrara Research and Development Corporation, Sep. 24, 1997.

"MEB–TCP Installation and Programming Manual," Niobrara Research and Development Corporation, Oct. 1, 1997.

"Internet Protocol, Darpa Internet Program, Protocol Specification—RFC:791," Defense Advanced Research Projects Agency, Sep. 1981.

"Transmission Control Protocol, Darpa Internet Program, Protocol Specification—RFC:793," Defense Advanced Research Projects Agency, Sep. 1981.

"[comp.unix.programmer] Unix–Socket–FAQ For Network Programming," Vic Metcalfe, Andrew Gierth and other contributors, Jan. 22, 1998.

"TCP/IP Illustrated, vol. 2, The Implementation," Gary R. Wright Richard Stevens, 1997 (Front Cover of Book)..

"Winsock 2 Information," Bob Quinn, 1995–1998 (last updated Dec. 5, 1998).

Website Information of PROFIBUS: Technical Overview, Mar. 1999.

Website Information of ODVA—The Open DeviceNet's Vendor Association.

Website of PROFIBUS International—Welcome Page.

Using World–Wide Web for Control Systems,, F. Momal, C. Pinto–Pereira, AT Division CERN, 1211 Geneva 23, http://mish231.cern.ch/Docs/ICALEPCS/1995/icalep95.htm., 1995.

When Technology Standards Become Counterproductive, Kenneth C. Crater, President, Control Technology Corporation, Hopkinton, MA dated Jul. 9, 1999, pp. 1–5.

A White Paper; State Language for Machine Control, Kenneth C. Crater, President, Control Technology Corporation, Hopkinton, MA dated Jul. 9, 1999, pp. 1–11.

New PC–based Process Control & Data Acquisition Software Integrates Remote Internet Capabilities with Fast Pentium Support, Fred A. Putnam, LABTECH President, pp. 1–3.

Aug. 1996 CONTROL Magazine—In the News—Electric Utility Industry Embarks on Automation Overhaul, pp. 1–10.

Jul. 1997 CONTROL Magazine—Magazine Software Review—NT Package Give Plant Access Through the Web, pp. 1–3.

Oct. 1996 CONTROL Magazine—Software Review—Article Archives, pp. 1–2.

ICS Instrumentation & Control Systems—Windows NT for real–time control: Which way to go?—ICS Magazine, pp. 1–8, Jul. 1999.

I&CS Jul. 1999—Special Report Software—Software: Open source OSs, objects, Web–based communications challenge status quo, (Wayne Labs, Senior Technical Editor), pp. 24–49.

Landis & Staefa MS 2000, pp. 1–2, Jan. 1999.

Landis & Staefa Standards and Open Protocols Integration System Architecture, p. 1, Jan. 1999.

Annabooks Bookstore, Programming and Interfacing the 8051, by Sencer Yeralan and Asutosh Ahluwalia, pp. 1–2, Jan. 1999.

SoftPLC Corporation—Java Support in SoftPLC Corp. Products, pp. 1–5, Jan. 1999.

Mach J. Company, MachJ, an enbeddable, clean room Java Virtual Machine, p. 1, Jan. 1999.

SoftPLC Corporation—The History of Programmable Controllers, Looking Back From the Year 2000 A.D. (Or How Computers Replaced Proprietary PLC'S), pp. 1–7, Jan. 1999.

SoftPLC Corporation—TOPDOC: Advanced PLC program development & documentation software, pp. 1–12, Jan. 1999.

Control Engineering Online Magazine Articles (Jul. 1998)—No, that's not a PC, it's a PLC, pp. 1–2, Jan. 1999.

Rockwell International Corporation, Allen–Bradley Introduces PLC–5/80E Controller for Ethernet Communication Networks, Jan. 1999.

Rockwell Automation—Search Results, pp. 1–2, Jan. 1999.

Rockwell International Corporation, Vision & Direction, The Direction of Automation Systems, pp. 1–4, Jan. 1999.

Rockwell International Corporation, Vision & Direction, The Role of Open Systems, pp. 1–4, Jan. 1999.

Rockwell International Corporation—Vision & Direction—The Direction of Automation Systems—Emergence of Application–Specific Control Solutions, pp. 1–2, Jan. 1999.

Rockwell International Corporation—Vision & Direction—The Direction of Automation Systems—The New Factory Worker, pp. 1–2, Jan. 1999.

Rockwell International Corportation, Vision & Direction, Control System Deliverables—The Next Step, pp. 1–2, Jan. 1999.

Rockwell International Corporation, Vision & Direction, Conclusion & Acknowledgments, pp. 1–2, Jan. 1999.

Rockwell International Corporation—Choices—Perspectives on the Future of Automation Control, p. 1, Jan. 1999.

Rockwell International Corporation—Allen–Bradley—Networks—Ethernet for Industrial Control—An Ethernet White Paper—Apr. 21, 1998, pp. 1–13.

Rockwell International Corporation—Automation Systems Control—General—World–Class Automation Systems from Allen–Bradley, Last Updated: May 7, 1998, pp. 1–12.

PC QUEST, Dec '97—Point, click, Control—C–Programmable controllers take the pain out of embedded control, pp. 1–2.

berthel—automation with imagination—PCI 100—Programmable logic controller for SIMATIC/IBM IPC, pp. 1–3, Jan. 1999.

YAHOO! Personalized Search Results for programmable logic controller internet access, pp. 1–3, Jan. 1999.

SIEMENS—SIMATIC report Jan. 1997—New in the SIMATIC Library, pp. 1–2.

CONTROL Magazine Aug. 1998—Field Test—Dynamic Software Makes Control Integration Easier, pp. 1–2.

Design and Reuse Web Site—EDTN Network—Analyze IP Database Content—Analyse Reuse Blocks per taxonomy tree, pp. 1–10, Jan. 1999.

Engineering Information, Inc.—Ei CPX Web 1990–94.

"Java and Programmable Automation Controllers, " CiMax: Edition Terrain, No. 13 –May–Jun. 1997, copy in French and translated copy; Certificate of Accuracy of translation from Merrill Corporation, dated May 19, 2004.

* cited by examiner

EMBEDDED FILE SYSTEM FOR A PROGRAMMABLE LOGIC CONTROLLER

RELATED APPLICATIONS

This application is related to a co-pending U.S. patent application Ser. No. 09/223,349 entitled "Interface to a Programable Logic Controller," filed on Dec. 30, 1998, and having the same common assignee.

TECHNICAL FIELD

The present invention relates to industrial automation, and in particular to an embedded file system for storage of programable logic controller applications symbols, graphics, web pages, and other data.

BACKGROUND OF THE INVENTION

Sophisticated industrial processes require the cooperative execution of numerous interdependent tasks by many different pieces of equipment. The complexity of ensuring proper task sequencing and management requires not only procedural logic, but also constant monitoring of equipment states to organize and distribute operations and detect malfunctions.

Today, many industries use programmable logic controllers to properly operate and monitor elaborate industrial equipment and processes. Industrial programmable logic controllers—PLCs, controllers—operate in accordance with a stored control program that causes the controller to examine the state of the controlled machinery by evaluating signals from one or more sensing devices (e.g., temperature or pressure sensors), and to operate the machinery (e.g., by energizing or de-energizing operative components) based on a procedural framework, the sensor signals and, if necessary, more complex processing.

Ordinarily, process operation is monitored, at least intermittently, by supervisory personnel by means of one or more central management stations. Each station samples the status of controllers (and their associated sensors) selected by the operator and presents the data in some meaningful format. The management station may or may not be located on the same site as the monitored equipment; frequently, one cental station has access to multiple sites (whether or not these perform related processes). Accordingly, communication linkage can be vital even in traditional industrial environment where process equipment is physically proximate, since at least some supervisory personnel may not be.

To facilitate the necessary communication, the controller and related computers (such as monitoring stations) are arranged as a computer network that uses some consistent protocol to communicate with one another. The communication protocol provides the mechanism by decomposing and routing messages to a destination computer identified by an address. The protocol may place a "header" of routing information on each component of a message that specifies source and destination addresses, and identifies the component to facilitate later reconstruction of the entire message by the destination computer. This approach to data transfer permits the network to rapidly and efficiently handle large communication volumes without reducing transfer speed in order to accommodate long individual message.

In typical computer networks having one or more programable logic controllers, a monitoring computer, which may be remotely located from any or all of the controllers to which it has access, periodically queries the controllers to obtain data descriptive of the controlled process or machine, or the controller itself. This data is then available for analysis by the monitoring computer.

The programable logic controllers used today have a very limited amount of memory and thus do not allow a user to customize how the requested information from the controller is displayed. Instead, the monitoring computer receives the requested information and configures it into the display format desired by the user. Likewise, the size and number of programs for execution by a programable logic controller is restricted to the limited memory space within the controller.

SUMMARY OF THE INVENTION

The present invention provides for storage of applications symbols, graphics, web pages, and other data within a server coupled to a programable logic controller.

A server embodying the present invention is operably connected to a network and a programable logic controller. The server includes a memory, an FTP server, and a HTTP server. The FTP server is operably connected to the memory and the network for transferring files into the memory. The HTTP server is operably connected to the memory and the network for transferring web pages onto the network. Also, the programable logic controller is provided access to the memory within the server for downloading files into the memory of the controller.

BRIEF DESCRIPTION OF THE DRAWINGS

In FIG. 1 and throughout the application, like reference numerals represent the same or identical components of the present invention.

DETAILED DESCRIPTION

Figure 1:
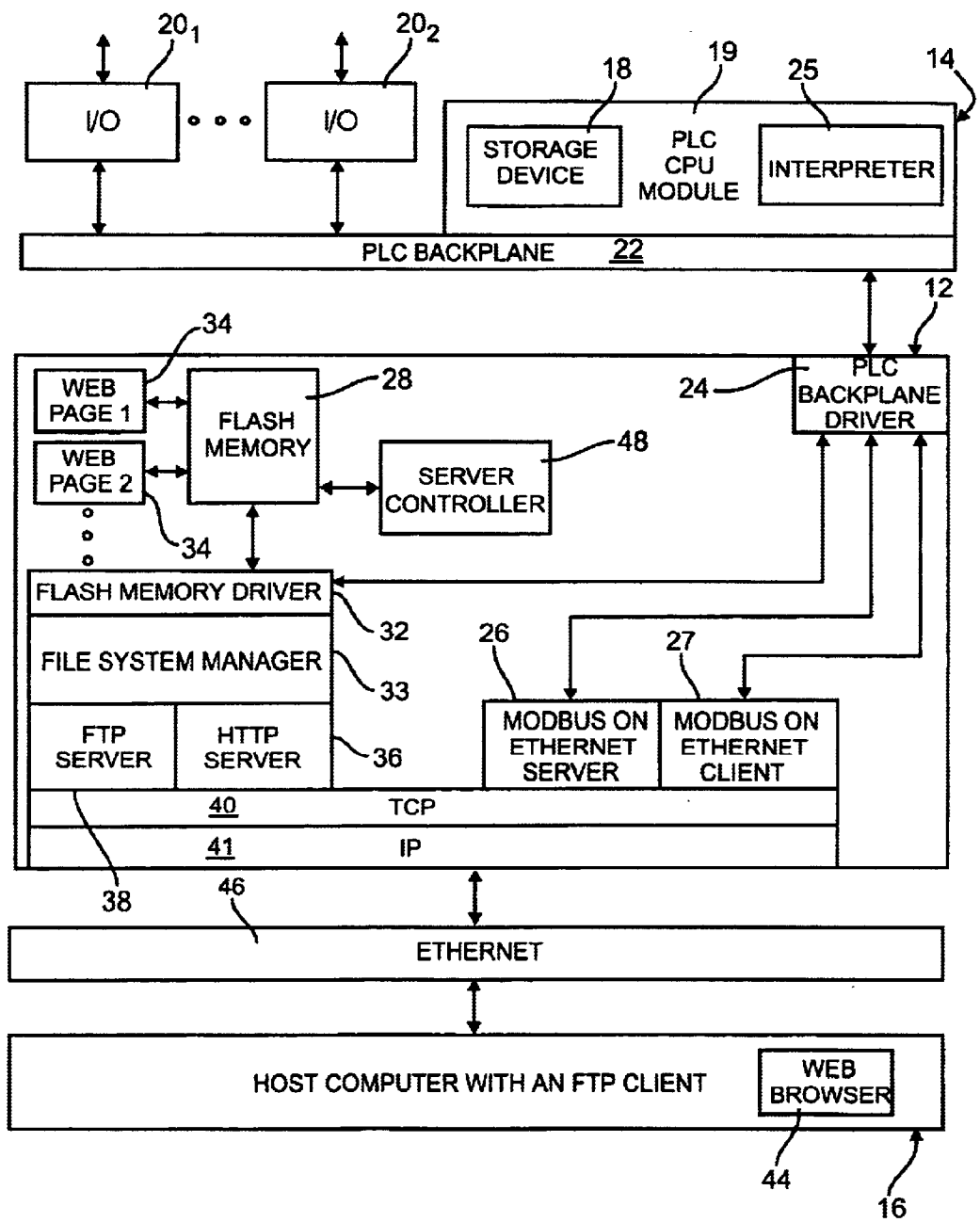
FIG. 1 is a simplified block diagram of an embedded server in accordance with the present invention operably connected between a programable logic controller and a host computer.

The Internet is a worldwide "network of networks" that links millions of computers through tens of thousands of separate (but interconnecting) networks. Via the Internet, users can access tremendous amounts of stored information and establish communication linkages to other Internet-based computers.

Much of the Internet is based on the client-server model of information exchange. This computer architecture, developed specifically to accommodate the "distributed computing" environment characterizing the Internet and its component networks, contemplates a server that services requests of other computers or clients that connect to it. The clients usually communicate with a single server or can use the server to reach other servers.

To ensure proper routing of messages between the server and the intended client, the messages are first broken up into data packets, each of which receives a destination address according to a consistent protocol, and which are reassembled upon receipt by the target computer. A commonly accepted set of protocols for this purpose are the Internet Protocol, or IP, which dictates routing information; and the transmission control protocol, or TCP, according to which messages are actually broken up into IP packets for transmission for subsequent collection and reassembly. TCP/IP connections are quite commonly employed to move data across telephone lines.

The Internet supports a large variety of information-transfer protocols such as the World Wide Web (hereinafter, simply, the "web"). Web-accessible information is identified by a uniform resource locator or "URL," which specifies the location of the file in terms of a specific computer and a location on that computer. Any Internet "node"—that is, a computer with an IP address (e.g., a server permanently and continuously connected to the Internet, or a client that has connected to a server and received a temporary IP address)- can access the file by invoking the proper communication protocol and specifying the URL. Typically, a URL has the format http://<host>/<path>, where "http" refers to the HyperText Transfer Protocol, "host" is the server's Internet identifier, and the "path" specifies the location of the file within the server. Each "web site" can make available one or more web "pages" or documents, which are formatted, tree-structured repositories of information, such as text, images, sounds and animations.

An important feature of the web is the ability to connect one document to many other documents using "hypertext" links. A link appears unobtrusively as an underlined portion of text in a document; when the viewer of this document moves the cursor over the underlined text and clicks, the link—which is otherwise invisible to the user—is executed and the linked document retrieved. That document need not be located on the same server as the original document.

Hypertext and searching functionality on the web is typically implemented on the client machine, using a computer program called a "web browser." With the client connected as an Internet node, the browser utilizes URLs— provided either by the user or the link—to locate, fetch and display the specified documents. "Display" in this sense can range from simple pictorial and textual rending to realtime playing of audio and/or video segments or alarms, mechanical indications, printing, or storage of data for subsequent display. The browser passes the URL to a protocol handler on the associated server, which then retrieves the information and sends it to the browser for display; the browser causes the information to be cached (usually on a hard disk) on the client machine. The web page itself contains information specifying the specific Internet transfer routine necessary to retrieve the document from the server on which it is resident. Thus, clients at various locations can view web pages by downloading replicas of the web pages, via browsers, from servers on which these web pages are stored. Browsers also allow users to download and store the displayed date locally on the client machine.

Most web pages are written in HyperText Markup Language, or HTML, which breaks the document into syntactic portions (such as headings, paragraphs, lists, etc.) that specify layout and contents. An HTML file can contain elements such as text, graphics, tables and buttons, each identified by a "tag." Markup languages, however, produce static web pages.

However, if desired, web-page designers can overcome the static page appearance dictated by HTML. The Java language is a well-known, machine-independent, interpreted computer language that facilitates dynamic display of information. Java-encoded "applets" are stand-alone programs embedded within web pages that can interact with the user locally, display moving animations and perform other functions on "Java-capable" browsers—that is, browsers which include a Java interpreter. The applet is transferred to the browser along with other web-page information and is executed by the Java interpreter; the data acted upon by the applet can be located on the same or a different web page, or a different server entirely, since applets can themselves cause the browser to retrieve information via hypertext links.

For example, suppose that a client users instructs the client-resident browser to obtain a document having the URL http://host/file.html. The browser contacts the HTTP server running on "host," and requests the document file- .html. The server finds this document and sends it according to the proper Internet protocol, along with a Multipurpose Internet Mail Extension or "MIME" identifier that specifies the document's type. When the client receives the document, the browser examines the MIME to determine whether it is capable of autonomously displaying the document, or whether an external resource (e.g., a specialized viewer to display video segments) is necessary. In a simple case, the document might contain text and graphics specified in HTML, and specify and image residing in a different file on a different server or on the same server. The browser renders the document in accordance with the HTML instructions and requests the image, displaying it in the document as specified by the instructions when the image arrives. In more complex cases the document may contain, for example, Java instructions, which are passed to the browser's Java interpreter.

Key to the concept of a web page, therefore, is the division of functionality between the client-based browser and the server-based web page, and the particular roles assigned to each. The browser locates, fetches and displays resources, executes hyperlinks and applets, and generally interprets web-page information; the web page contains data, hyperlink addresses, transfer protocols and computer instructions defining "potential functionality" that may be executed by the browser. Ordinarily, web pages reside on servers accessible via the Internet. However, the above-discussed mode of splitting functions between web pages and browsers can be instituted on internal networks as well. These networks, sometimes called "intranets," support the TCP/IP communication protocol and typically serve the needs of a single business (of business department), which may be located at a single site (with individual clients connected by a simple local-area network) or multiple physically dispersed sites requiring a wide-area network. Various of the computers forming the intranet network can be utilized as servers for web pages, each with its own URL and offering access to network client computers via TCP/IP.

A server module 12—server, module—in accordance with the present invention is depicted in FIG. 1. The server 12 is operably connected between a programmable logic controller 14 and a host computer 16. The server 12 provides web access to controller data (i.e., variable, system diagnostics, configuration information, I/O status) through "thin clients" (i.e., web browsers). The server 12 provides meaningful, structured information to users via the open communication standard to TCP/IP and HTTP. In particular, anyone with a web browser can browse the controller as if it was just another web site.

In FIG. 1, the programable logic controller 14 is conventional and includes one or more storage devices indicated generally at 18. The controller 14 includes a CPU module 19 for executing program instructions retrieved from storage 18 to operate, for example, a piece of industrial equipment. The storage device 18 typically is composed of a combination of volatile RAM for temporary storage and processing, and non-volatile, programming read-only memory ("PROM") that contains permanent aspects of the controller's operating instructions.

The controller 14 also includes a series of input/output modules shown representatively at $20_1$, $20_2$ that sense the condition of, and send control signals to, the controlled machine (not shown) over a communication link (indicated by arrows). This communication link facilitates the bidirectional exchange of signals between each I/O module 20 and an associated device (e.g., a sensor or an actuator).

The controller 14 includes an internal bus provided by a backplane 22. The internal bus provides for operably connecting the modules of the programable logic controller 14 to each other via a local-area network. The communication of the modules over the internal bus can be accomplished by using a specific protocol such as, for example, the MODBUS Application Protocol by Schneider Automation, Inc.

The programable logic controller 14, and in particular the CPU module 19, provides for operating the I/O modules 20. The programable logic controller 14, via the I/O modules 20, examines the condition of selected sensing devices associated with the controlled equipment, and, based thereon, sends appropriate operative control signals to the equipment.

The instructions (i.e., symbols) for operation of the controller 14 are written in a relatively high-level language that can be stored in block 18 for permitting not only manipulation of input and output data, but also arithmetic and timing functions, file-handling capabilities and other complex tasks. These instructions are translated into machine-readable code by the controller via an interpreter 25. For example, one standardized type of instruction symbolically represents control functions according to a relay ladder diagram; it may be desired, however, to utilize state-control languages that represent controller actions in terms of steps, each of which consists of a command that creates actions and one or more instructions for leaving the step.

Server 12 is operably connected to the backplane 22 of the programable logic controller 14 via a backplane driver 24. The server 12 allows Internet/Intranet access to information stored in the programable logic controller 12 including controller data, I/O diagnostics, configuration information through a "thin client" (i.e., web browsers). The server 12 is substantially "plug-and-play" wherein most of the server system is transparent to the user (web browser) and does not have a user interface in the traditional sense.

In particular, the server 12 allows Internet/Intranet access to controller and network information by having a HTTP server 36 and a File Transfer Protocol (FTP) server 38 within the module 12. These servers provide a set of HTML pages that allow the user to display controller configuration, controller status, I/O module configuration, I/O module status, to view and modify register values and display the Ethernet statistics. The user is also allowed to customize Web pages and download them into the server.

The use of the web along with allowing for uploading customizable HMTL pages provides a low-cost ethernet connection Web Browser view to programable logic controller data and diagnostics.

As stated previously, the MODBUS protocol is preferably used to communicate between the embedded server 12 and the controller 14. In addition, the server 12 communicates with the host 16 over an Ethernet network 46. Accordingly, the embedded server 12 provides both a MODBUS on Ethernet Server 26 and a MODBUS on Ethernet Client 27 for providing communications between the controller 14 and the host 16.

The embedded server 12 also includes a flash memory 28 operably connected via a flash memory driver 32 to both the controller backplane driver 24 and a file system manager 33. Stored within the flash memory 28 are variable/symbol information that can be downloaded to the programable logic controller 14 for execution. The variable/symbol information is loaded into the memory via the FTP server 38 from a database or the like. The use of the FTP server 38 provides for the efficient transfer of variable/symbol information along with other program files into the memory 28.

The flash memory 28 also provides storage for supporting the HTTP server 36, the FTP server 38, and operation of TCP/IP. Moreover, the flash memory 28 stores JAVA applets and data structures defining one or more web pages shown representatively at $34_1$, $34_2$. The web pages 34 consists of ASCII data obtained from one or more of I/O modules 20, HTML formatting instructions and associated data, and/or "applet" instructions (i.e., JAVA code) for causing a properly equipped remote computer to display the data in a dynamic fashion.

In particular, to implement reading information from the controller 14 and displaying it in HTML pages, much of this information handling is done by the JAVA applets running on the browser of the host 16. Preferably, the applets make data requests of the controller 14 with ModBus commands over TCP/IP.

Management and transmission of web pages 34 to a querying computer is handled by the File System Manager 33 and the HTTP server 36 for allowing module 12 to function as a network server. The host or client 16 connects to the server 12 using the IP address of the HTTP server 36 assigned by the network administrator. The HTTP server 36 downloads HTML documents to the user's web browser from the flash memory 28 such as, for example, the "home page" of the server 12. If desired, the server 12, via the "home page," can prompt the user for a predefined password to allow access to additional web pages with "read-only" permission and another password to allow "read-write" permission. Thus, if the user is knowledgeable in HTML, the appearance of the home page can be customized by downloadind into the flash memory 28.

As such, HTTP is the primary protocol used to communicate between the host computer 16 and the embedded server 12. The HTTP server 36, commonly called a web server, is the "active component" of the embedded server 12 that listens on a designated TCP/IP port for HTTP requests from web browsers. When a request for a Web page (HTML document) is sent to the HTTP server 36, the server retrieves, or dynamically creates, the appropriate page from the flash memory 28, via the file system manager 30, and transmits it to the browser using HTTP.

As previously indicated, FTP is another protocol used to communicate between a client and the embedded server 12 which is handled primarily by block 38. The FTP server 38 is the "active component" of the module 12 that listens on a designated TCP/IP port for requests for programs stored within the flash memory 28. Furthermore, the FTP server 38 provides for uploading programs and web pages into the flash memory 28.

Incoming data from I/O modules 20 can be, if desired, processed by the programable logic controller 14 before being copied to one of the web pages 34 within the embedded server 12. Because of the linking capabilities of the web, it is not necessary for the data to be stored in the web page containing the display instructions; instead, the latter page may contain a "hyperlink" pointer to a different web page in which data is accumulated. In addition, a web page can obtain data from other web pages (e.g., from different controllers) by accessing those web pages when appropriate. For example, if a cluster of controllers are operationally related such that data from one is usefully combined with data from the others, each page of the cluster can contain instruction to access the other pages (or their associated data pages) when accessed by a user, and the applet configured to present data from the entire cluster. Alternatively, the applet can be configured to cause the client's browser to access the web page. As used herein, data is "associated with" a web page or an applet if it is stored as part of the web page or applet, or stored in a directly or indirectly hyperlinked web page.

Network communication blocks 40 and 41 provide for operating and connecting the server module 12 to a host or client computer 16 over a local-area network. Accordingly, communication blocks 40 and 41 include data-transmission circuitry to transfer streams of digitally encoded data over telephone or other communication lines.

Preferably, computer 16 functions as a network client and consists of a Personal Computer (PC) running a WINDOWS based graphical user interface supplied by Microsoft Corporation. Computer 16 also includes a network interface for facilitating connection to and data transfer through the computer network 46 which can be a local network, the Internet, or an Internet-linked local network. Naturally, computer 16 also contains various conventional components, i.e., a display, a storage system, an operating system and a graphical user interface, and a keyboard and/or position-sensing device (e.g., a mouse) for accepting input from the user. For convenience of presentation, these are not shown.

Also loaded onto the computer 16 is a web browser 44 that supports JAVA, such as INTERNET EXPLORER (supplied by Microsoft Corp.) or NETSCAPE NAVIGATOR (supplied by America On Line) and communicates with the embedded server 12, which in turn communicates with the programable logic controller 14. Preferably, the host computer 16 and the embedded server 12 communicate with each other via an Ethernet TCP/IP network 46.

In particular, the web pages 34 within the flash memory 28 enable a user of the host computer 16 to view certain information about the controller 14 without a custom client application. For instance, if the host computer 16 includes a standard web browser 44 and access to the embedded server 12, then a user of the host can view the contents of the controller 14 connected to the embedded server by downloading a page 30 stored within the flash memory 28.

In another example, the host computer 16, via the web browser 44, sends requests to the embedded server 12 to view a set of controller registers within the controller CPU module 48. The server 12 then queries the controller 14 via the MODBUS on Ethernet Client for the requested information. The controller 14 responds to the query by sending the requested data to the server 12. Finally, via the MODBUS on Ethernet Server 40, the server 12 sends this information back to the web browser client 16 that requested it.

As indicated above, the web pages 34 within the flash memory 28 allow a user of the web browser 44 to "browse" the contents of a programable logic controller 12 as if it was just another web site. After the web page has been downloaded to the host 14, users can use their web browser to connect to the programable logic controller and view controller information such as its status, I/O health, configuration information, and runtime values of variables and registers.

While the specific embodiments have been illustrated and described, numerous modifications come to mind without significantly departing from the spirit of the invention and the scope of protection is only limited by the scope of the accompanying Claims.

We claim:

1. A server operably connected between an industrial programmable logic controller and a network for storage of web pages and programs comprising:

a memory device for storing the web pages and programs;

an FTP server operably connected to the memory and the network for uploading the programs into the memory from the network;

an HTTP server operably connected to the memory and the network for downloading the web pages from the memory onto the network;

a TCP/IP stack operably connected between the network and the FTP and HTTP server; and, means for allowing the industrial programmable logic controller access to the memory for downloading the programs into the industrial programmable logic controller, the industrial programmable logic controller being operably connected to an input/output module wherein a communication link facilitates bi-directional exchange of signals between the input/output module and an associated device.

2. The server of claim 1, further comprising a back plane driver operably connected to the industrial programmable logic controller and the memory.

3. The server of claim 1, further comprising another server operably connected to the industrial programmable logic controller and the network.

4. The server of claim 1, further comprising a file system manager operably connected between the memory and the FTP and HTTP servers.

5. A server operably connected between an industrial programmable logic controller and a computer attached to a network comprising:

a flash memory for storing web pages and programs;

an FTP server operably connected to the memory and the network for uploading the programs into the memory from the computer attached to the network;

an HTTP server operably connected to the memory and the network for downloading the web pages from the memory onto the computer attached to the network;

a TCP/IP stack operably connected between the network and the FTP and HTTP servers; and, means for allowing the industrial programmable logic controller access to the memory for downloading the programs into the industrial programmable logic controller, the industrial programmable logic controller being operably connected to an input/output module wherein a communication link facilitates bi-directional exchange of signals between the input/output module and an associated device.

6. The server of claim 5, further comprising a back plane driver operably connected to the industrial programmable logic controller and the memory for receiving and transmitting signals onto a bus.

7. The server of claim 6, further comprising another server operably connected to the back plane driver and the network.

8. The server of claim 5, further comprising a file system manager operably connected between the memory and the FTP and HTTP servers for controlling the storage and retrieval of web pages and programs from the memory.

9. A server operably connected between an industrial programmable logic controller and a computer attached to a network comprising:

a flash memory for storing web pages and programs;

an FTP server operably connected to the memory and the network for uploading the programs into the memory from the computer attached to the network;

an HTTP server operably connected to the memory and the network for downloading the web pages from the memory onto the computer attached to the network;

an TCP/IP stack operably connected between the network and the FTP and HTTP servers for supporting the transfer of the programs and the web pages over the network; and, means for allowing the industrial programmable logic controller access to the memory for downloading the programs into the industrial programmable logic controller, the industrial programmable logic controller being operably connected to an input/output module wherein a communication link facilitates bi-directional exchange of signals between the input/output module and an associated device.

10. The server of claim 9, further comprising a back plane driver operably connected to the industrial programmable logic controller and the memory for receiving and transmitting signals onto a bus.

11. The server of claim 9, further comprising a file system manager operably connected between the memory and the FTP and HTTP servers for controlling the storage and retrieval of web pages and programs from the memory.

* * * * *